Sept. 5, 1933.    W. D. HAVENS    1,925,533
COMPRESSION PIPE COUPLING
Filed May 12, 1931
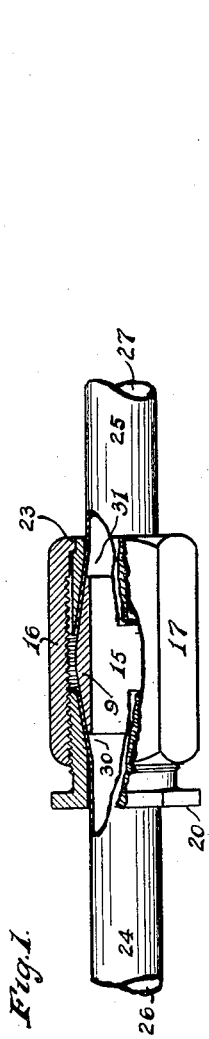
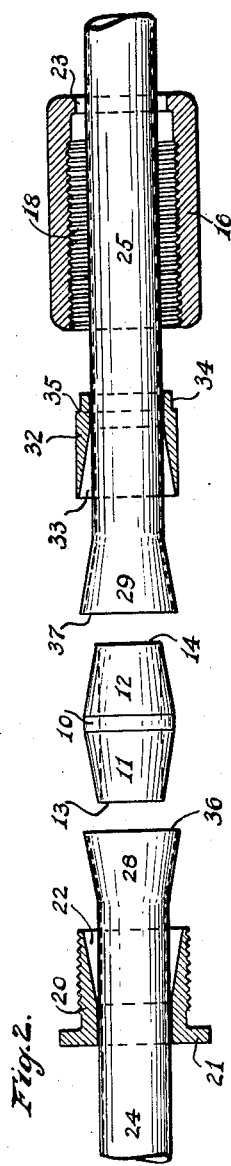
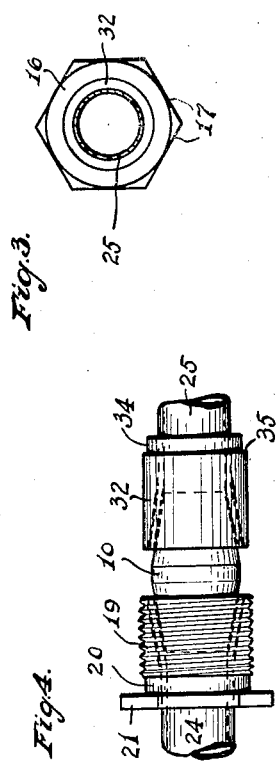
INVENTOR
William D. Havens
BY
Harold D. Penney    ATTORNEY Patented Sept. 5, 1933

1,925,533

UNITED STATES PATENT OFFICE 1,925,533

COMPRESSION PIPE COUPLING

William D. Havens, Schenectady, N. Y.

Application May 12, 1931. Serial No. 536,756

1 Claim. (Cl. 285—86)

My present invention relates to improvement in pipe couplings and has particular reference to compression couplings in which the cooperating elements are constructed of substantially standard, predetermined dimensions to hold adjoining pipe or conduit terminals in fluid tight or gas tight condition.

The invention, constructed of four parts, which may include two formed parts of pipes to be coupled, in a preferred embodiment thereof, has for one of its objects the provision of a coupling in which the transverse plane of the pipe line, at the adjoining terminals of the pipes, is maintained substantially internally unbroken or flush with the bore of the pipes.

A feature of the invention is a hollow tubular member or pipe section in which opposed tapered ends incline outwardly from a central peripheral expansion; and as the pipe sections to be joined are provided with expanded or flared terminal, which find seats on the tapered ends, the commencement of the pipe expansions and the extreme ends of the said tubular member cooperate to render the bore surfaces practically flush thereat, or at least to form a negligible annular recess.

Since it is frequently necessary to install or disconnect pipes in limited areas, or practically inaccessible places, another object of the invention is the provision of a coupling with which a liquid tight union may be effected in such limited area, with a minimum of equipment, such as wrench, and by an operator or person who may not be highly skilled in the art. The coupling is equally adapted for expeditions make or break purposes.

Consistent with the foregoing, a further object of the invention is the provision of a reliable and compact structure which, including a comparatively thin or small outer casing, may be effective to cooperate with the tapered insert and expanded pipe terminals for bringing about the stated result. Therefore, a casing, which includes coacting longitudinally contractible members or collars, is provided with contracted terminals, so that when these are urged against the pipe terminals the latter are compressed. Since the material of the collars, such as brass, is preferably harder than that of the pipes, the extreme ends or edges of the pipes become flattened or deformed to contribute further to the efficiency of the joint.

One of the contracted ends of the outer casing is in the form of a flange; and another feature of the invention is a collar, in which is a groove or annular recess to receive the flange. This latter collar tends to fixedly embrace one of the pipe terminals, and the other contracted end of the casing tends to fixedly embrace the other pipe terminal, this being because of the area of the mating frictional surfaces. As the area of the surface of the flange disposed in the recess is small, this results in assuring freedom of rotation of the outer casing or collar member during axial movement of both members of said casing, to secure a still further object of the invention.

Since the material of the pipes is relatively softer, as aforesaid, flaring thereof is easily accomplished, by inward movement on the tapered terminals of the inner member, subsequent to initial positioning of these terminals and assembly of the threaded members of the outer casing, with its coacting recessed collar.

A still further object is the provision of a perfectly liquid tight joint in which a minimum amount of pipe material is used; that is to say with a minimum of take-up of parts involved.

With the above indicated objects in view, the embodiment of the invention at present disclosed consists in a novel construction and combination and arrangement of parts, the essential features of which are herein clearly described, and fully illustrated in the accompanying drawing, in which:

Fig. 1 is a lateral elevational view of my improved coupling device, partly broken away and in section;

Fig. 2 is a lateral elevational view, partly in section, and in which some of the parts are shown in spaced relation;

Fig. 3 is an end elevational view, looking at the right hand end of Fig. 1; and

Fig. 4 is a fragmentary lateral view.

Similar characters of reference refer to corresponding parts throughout the several views.

The inner hollow tubular member or section 9 includes a centrally disposed expansion having a plain peripheral band 10, from which surfaces 11, 12 incline to edges 13, 14, between which is a plain inner face or periphery 15.

An externally hexagonal casing 16, having like flat surface portions 17, is internally threaded at 18 to cooperate with mating threads 19 of a second casing member 20, which includes hexagonal surfaces 21, for receiving any turning tool. This casing is terminally contracted or of reduced diameter, there being an inclined surface 22 on the section 20, and an inwardly projecting flange 23 on the section 16.

As the bore 15 of the member 9 is identical in diameter with the pipe section 24, and with the pipe section 25, the inner surfaces 26, 27 of these pipes are flush with the said surface 15. The pipe 24 has a flared terminal 28, and the pipe 25 a like terminal 29; and the edges 13, 14 of the insert 9 may be quite acute or sharp, to providing a seamless or uniform bore surface 26, 15, 27, or at least only to include such annular recesses 30, 31 as are negligible.

In the present instance the structure includes a collar 32, which is provided with an inclined surface 33, like the surface 22. This collar has an external groove or annular recess 34, in which the flange 23 engages.

As the inner surface of this flange 23 engages the perpendicular face 35 of the collar 32, the result is that frictional resistance is reduced to a minimum thereat, to facilitate turning movement of the section 16, it being seen that the engaging areas of the inner surfaces 22, 33 of the outer casing and the coacting surfaces of the expansions 28, 29 are relatively much larger.

Therefore, while the collar 20 is held during turning movement of the collar 16, for urging the pipe terminals axially to tightly embrace the double-tapered member 9, the collar 32 is also automatically held. The surfaces 33, 29 and 22, 28 respectively (see Fig. 2) need not be in true parallelism, so that the inner portions of the surfaces 22, 33 may exert a very positive pressure against the extreme portions or edges 36, 37 of the pipes to mutilate or flatten the same for additional tightening action.

With my improved coupling, economy is effected both in cost of installation and manufacture. All the parts, which are light, are easily made on standard screw machines, and the device is well suited for quantity production.

As the hereinbefore described construction admits of considerable modification, without departing from the invention, the particular arrangements shown should be taken as illustrative, and not in a limiting sense. Therefore, the scope of the protection contemplated is to be taken solely from the appended claim, interpreted as broadly as is consistent with the prior art.

What I claim is:

A metal coupling device for a pair of expanded pipe terminals comprising in combination an inner tubular member having tapered ends for engaging the inner peripheries of said terminals, which latter have their edge portions spaced apart, a collar slidably engaging one of said pipes at its expansion and having external threads, another collar slidably engaging the other pipe at its expansion and having an annular seat, a casing having at its outer end and substantially flush with the outer end of the last mentioned collar a flange, said flange movably engaged on said seat, inclined annular faces on said collars and engaging the peripheries of said terminals, and internal threads on the opposite end of said casing for threadedly engaging the first threads whereby to draw said faces inwardly over said portions for urging the latter into fluid tight engagement with said tapered ends.

WILLIAM D. HAVENS.